(12) United States Patent
Klug

(10) Patent No.: US 7,676,483 B2
(45) Date of Patent: Mar. 9, 2010

(54) EXECUTABLE TASK MODELING SYSTEMS AND METHODS

(75) Inventor: Tobias Klug, Frankfurt (DE)

(73) Assignee: SAP AG, Walldorf (DE)

( * ) Notice: Subject to any disclaimer, the term of this patent is extended or adjusted under 35 U.S.C. 154(b) by 324 days.

(21) Appl. No.: 11/234,218

(22) Filed: Sep. 26, 2005

(65) Prior Publication Data

US 2007/0074211 A1 Mar. 29, 2007

(51) Int. Cl.
*G06F 17/30* (2006.01)
(52) U.S. Cl. .................. 707/101; 709/224; 715/200
(58) Field of Classification Search ............. 707/100, 707/104.1, 103, 101; 709/224; 715/200
See application file for complete search history.

(56) References Cited

U.S. PATENT DOCUMENTS

| | | | |
|---|---|---|---|
| 6,044,394 A | | 3/2000 | Cadden et al. |
| 6,067,548 A * | | 5/2000 | Cheng ................... 707/103 R |
| 6,480,876 B2 | | 11/2002 | Rehg et al. |
| 6,691,006 B2 | | 2/2004 | Sinex |
| 2004/0122701 A1* | | 6/2004 | Dahlin et al. ................. 705/2 |
| 2006/0064696 A1* | | 3/2006 | Lin et al. ..................... 718/100 |
| 2006/0282302 A1* | | 12/2006 | Hussain ......................... 705/9 |
| 2007/0027915 A1* | | 2/2007 | Morris ...................... 707/104.1 |
| 2008/0091464 A1* | | 4/2008 | Lipscher et al. ............... 705/2 |

OTHER PUBLICATIONS

Stumpf et al., predicting user tasks: I know what you are doing!, Jan. 2005, 6 pages.*

Tim Clerckx et al., "DynaMo-Aid: a Design Process and a Runtime Architecture for Dynamic Model-Based User Interface Development," available at http://research.edm.luc.ac.be/~kris/research/publications/ehci-dsvis2004/clerckxluyten-ehcidsvis2004.pdf.

Adriana-Mihaela Tarta, "Task Modeling in Systems Design," *Studia Univ. Babes-Bolyai, Informatica*, vol. XLIX(2): pp. 37-44 (2004).

M. Abrams et al., "UIML: An Appliance-Independent XML User Interface Language," *Proceedings of the 8th WWW Conference*, (1999), available at http://giove.cnuce.cnr.it/ctte.html.

S.D.J. Barbosa et al., "Adopting a Communication-Centered Design Approach to Support Interdisciplinary Design Teams," *SE-HCI workshop at ISCE* (2004) Edinburgh.

E. Furtado et al., "KnowiXML: A Knowledge/Based System Generating Multiple Abstract User Interfaces in USIXML," *Proc. Tamodia 2004*, Prague, pp. 121-128.

(Continued)

*Primary Examiner*—John R. Cottingham
*Assistant Examiner*—Noosha Arjomandi
(74) *Attorney, Agent, or Firm*—Finnegan, Henderson, Farabow, Garrett & Dunner, L.L.P.

(57) ABSTRACT

Systems and methods are provided for task modeling with models that are adaptive and executable at runtime. In one implementation, a method is provided for executing a task model at runtime. The method may comprise providing a task model comprising a plurality of tasks, executing an application to schedule one or more of the tasks, and monitoring a state of one or more of the tasks. Further, the method may include detecting a change in the state of one or more of the tasks, and updating, during runtime execution, the task model based on the detected change in the state of one or more of the tasks.

20 Claims, 9 Drawing Sheets

OTHER PUBLICATIONS

Q. Limbourg et al., "UsiXML: A User Interface Description Language for Context-Sensitive User Interfaces," *Proc. of the ACM AVI 2004* Workshop.

Giulio Mori et al., "CTTE: Support for Developing and Analyzing Task Models for Interactive System Design," *IEEE Transactions on Software Engineering*, vol. 28, No. 9 (Sep. 2002), pp. 1-17.

Giulio Mori et al., "Tool Support for Designing Nomadic Applications," *In Proc. of IUI 2003*, Miami, Florida, USA, pp. 141-148.

Nicole Stavness et al., "Supporting Flexible Business Processes with a Progression Model," available at www.usask.ca/faculty/kas/papers/MBUI_2004_Progression.pdf.

"Home of the USer Interface eXtensible Markup Language," available at http:// www.usixml.org, paper and slides of the CAiSE '2005, (Sep. 22, 2005).

"The ConcurTaskTrees Environment," Version 1.5.9b (last update Jan. 19, 2005), available at http://giove.cnuce.cnr.it/ctte.html.

\* cited by examiner

FIG. 9

|  | | 23.4.1968 |
|---|---|---|
| Hans | male | age 38 |
| Müller | | Influenza |

- ☐ small hemogram
- ☐ small hemogram
- ☐ retikulozytes
- ☐ vitamin B12
- ☐ folic acid
- ☐ haptoglobine
- ☐ heart
- ☐ abdomen
- ☐ kidney
- ☐ elevated blood lipids
- ☐ vessel
- ☐ BSG-depression finish lab order

EXECUTABLE TASK MODELING SYSTEMS AND METHODS

BACKGROUND

1. Field of the Invention

The present invention generally relates to the field of data processing and computerized systems and methods for task modeling. More particularly, the invention relates to computerized systems and methods for providing task models that are adaptive and executable at runtime.

2. Background Information

Computers and software solutions have been developed to organize activities and ensure that the necessary steps are performed to achieve a desired result or goal. For example, users may follow instructions from a computerized system or method. Such solutions may also be used to perform calculations necessary to solve a problem and/or to control commercial machinery or other equipment. Further, for more complex activities, these solutions may be used to assist users to accomplish tasks by organizing and prioritizing the steps needed to achieve a goal.

Activities related to a goal may be defined in terms of tasks. A task may describe an action or event necessary to reach the goal. In general, tasks may relate to actions or events performed by users, systems, objects in a user's environment, and/or other entities needed to accomplish the goal.

Conventionally, task models have been used to capture and organize a set of tasks a user needs to perform in order to achieve a defined goal. Task models may define relationships and dependencies between tasks in a task model. For example, a task model may be defined that allows a customer to purchase a good at a store. The tasks in such a task model may include, for example, greeting the customer, obtaining a good, entering an order, displaying the order on an employee's screen, displaying a total on a customer screen, and completing the transaction. The task model may also define the relationships between the tasks, such as the order in which they should be processed to accomplish the goal of selling a good to the customer.

Current task models define the relationship between tasks at design time. These task models attempt to define tasks and the relationship between tasks during the development phase. In some solutions, the task model, tasks, and relationships between the tasks are embedded into a software application, making later execution of the application static or concrete.

However, static task models require all of the tasks and information to be compiled into the application and user interface during design. This is difficult to accomplish because users have varying desires and preferences. Different users may desire separate features in an application or a customized layout of a user interface. As a result, system designers utilize expansive resources trying to predict the future needs of a user and develop task models to accommodate these needs.

Because current task models and solutions cannot adapt to specific circumstances and the varying desires of users, flexibility is lost. Additionally, current static task models provide a fixed user interface. If a user does not like the user interface or if the interface becomes obsolete, the user may reject the entire application and choose another vendor.

In view of the foregoing, there is a need for computer-implemented systems and methods that provide a dynamic and context aware user interface for task modeling. Dynamic solutions of this type are also needed for monitoring interactions with a task model at runtime. Further, dynamic task modeling systems and methods are needed that allow applications and task models to adapt to the actions of a user. In this way, production of applications may be simplified by providing applications and task models that may be customized by users having varying needs.

SUMMARY OF THE INVENTION

Consistent with embodiments of the invention, systems and methods are provided for task modeling. With such embodiments, task models may be provided that are adaptive and executable at runtime, such as during runtime execution of an application.

In accordance with one embodiment, a method is provided for executing a task model at runtime. The method may comprise providing a task model comprising a plurality of tasks, executing an application to schedule one or more of the tasks, and monitoring a state of one or more of the tasks. Further, the method may include detecting a change in the state of one or more of the tasks, and updating, during runtime execution, the task model based on the detected change in the state of one or more of the tasks.

According to another embodiment, a system is provided for executing a task model at runtime. The system may comprise means for executing an application to schedule one or more tasks of a task model, means for monitoring a state of one or more of the tasks and for detecting a change in the state of one or more of the tasks, and means for updating, during runtime execution of the application, the task model based on the detected change in the state of one or more of the tasks.

Consistent with an embodiment of the invention, computer programs may also be provided with program coding means which are suitable for carrying out methods and implementing systems consistent with the invention, as described herein, when the computer program is run on a computer.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the invention and together with the description, serve to explain the principles of the invention. In the drawings:

FIG. 9 illustrates an exemplary user interface screen shot, consistent with an embodiment of the invention.

DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
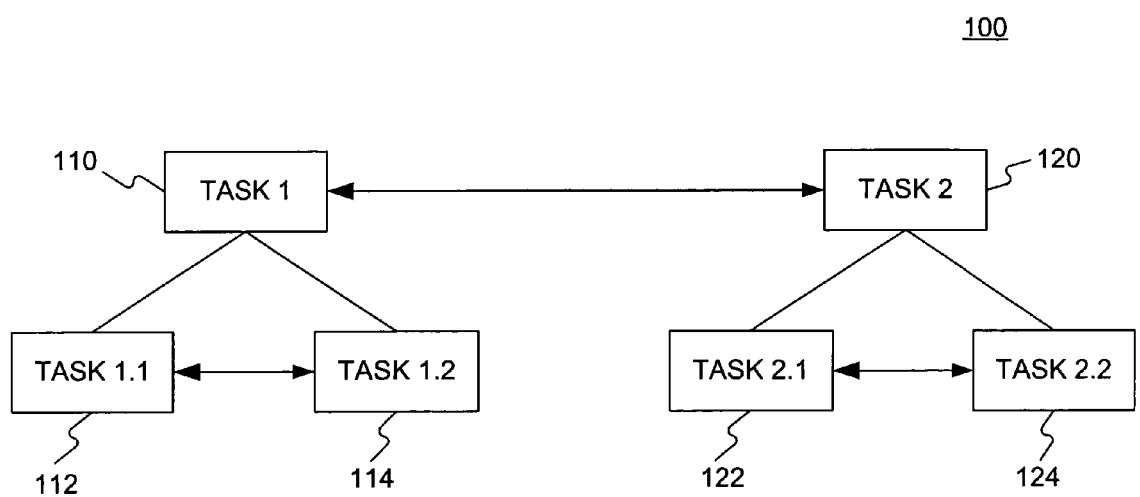
FIG. 1 is an exemplary task model, consistent with an embodiment of the invention.

FIG. 1 illustrates an exemplary task model 100, consistent with an embodiment of the present invention. Task model 100 may include a plurality of tasks 110, 112, 114, 120, 122, and 124, which may be performed to accomplish a desired goal or result defined by task model 100. Task model 100 may be memorialized on paper and/or electronically stored in a database or memory of a computerized system or environment.

Task models may arrange tasks hierarchically with increasing levels of detail to define relationships between tasks and constraints between tasks. A task that is divided into additional tasks may be referred to as a parent task. A parent task may also be referred to as a composite task, because the parent task may be composed out of several other tasks. The tasks that a parent task is divided into may be referred to as child tasks or children tasks. For example, with reference to FIG. 1, task 112 and task 114 are children to parent task 110, and tasks 122 and 124 are children to parent task 120.

Task models may describe what pieces of information may be exchanged between tasks and how the information may be exchanged. Further, tasks may be related to and communicate with each other. By way of example, in the embodiment of FIG. 1, task 110 and task 120 are related and can communicate with each other (represented in the figure by a line with the arrows on each end). The same may be true as between child tasks (e.g., tasks 112 and 114 in FIG. 1 are related and can communicate with each other). Additionally, tasks that are not directly related may communicate with each other, such as task 112 and task 122.

To further illustrate, if task model 100 defines a method for a doctor to interact with a patient, task 110 may be "obtain patient biography." The doctor may perform task 110 manually, such as obtaining a patient file, or may obtain the information electronically, such as through a database. Task 110 may be further divided into child tasks 112 and 114. In such a case, task 112 may be "determine if patient has drug allergies" and task 114 may be "check patient medical history." Furthermore, task 120 may be "examine a patient" and may be divided into child tasks 122 and 124. For example, task 122 may be "check blood pressure" and task 124 may be "determine weight."

The hierarchy of a task model may have any number of levels, such that additional parent tasks may be needed in addition to task 110 and task 120 to achieve a given goal. Similarly, tasks 112, 114, 122, and 124 may be further divided into children tasks in order to achieve the goal.

In accordance with one embodiment, tasks may be used in a plurality of task models and by a plurality of users. For example, task 122 "check blood pressure" may belong to task models for a plurality of doctors and may be performed by a nurse rather than a doctor.

In accordance with another embodiment, task model 100 may define temporal relationship(s) between tasks, as described in further detail below. Temporal relationships may define the relative timing of two related tasks. For instance, certain tasks may be defined as being performed prior to others, such as determining whether a patient has drug allergies before prescribing medication. Further, temporal relationships may define that certain tasks are performed after, during, before, starting before, or ending after other tasks.

Additionally, task model 100 may define semantic relationship(s) between tasks and allow dynamic runtime communication between tasks. Semantic relationships may be relationships that provide information about the tasks. For example, a semantic relationship may indicate that a first task is a parent of other tasks or that the first task is a child of other tasks. Semantic relationships may also indicate that a task is an alternative for another task. By identifying alternatives for tasks, the task model may dynamically substitute an alternative task at runtime. In one embodiment, semantic relationships between tasks are captured by a model semantics component, such as that described in detail below.

Returning the previous example, task 114 "check patient medical history" may establish that the patient doesn't have a medical history. In this case, task 114 may communicate with task 122 to "check blood pressure" of a patient for the first time and establish a medical history.

Figure 2:
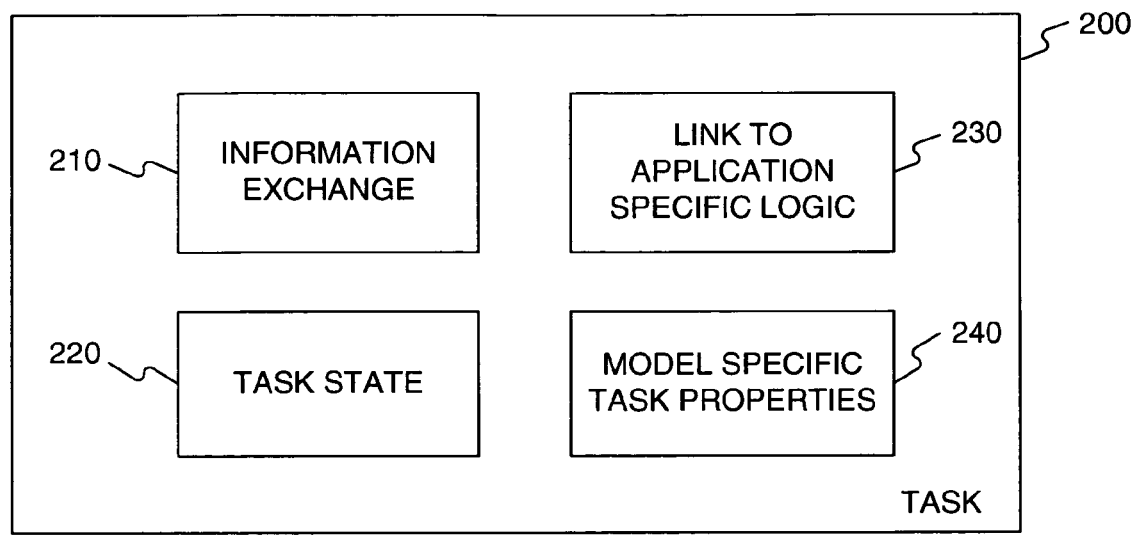
FIG. 2 illustrates an exemplary implementation of a task, consistent with an embodiment of the invention.

FIG. 2 illustrates an exemplary implementation of a task 200, consistent with an embodiment of the present invention. Task 200 may be implemented through any suitable combination of hardware, software and/or firmware. For example, task 200 may be implemented using object oriented programming, such as by creating an instance of a class for each task 200.

As shown in FIG. 2, task 200 may include a number of components, attributes and/or parameters that are used to control the interaction and execution of the task when defined as part of a task model. For example, task 200 may include information exchange 210, task state 220, link to application specific logic 230, and model specific task properties 240.

Information exchange 210 may be implemented with software and adapted to handle and store information that is sent to and from task 200. In this regard, input and output ports may be provided. The input and output ports may be implemented, for example, using object oriented programming such as classes or lists of named variables. In one embodiment, each task 200 includes one or more named input ports and output ports that are used to exchange information with other tasks (similarly constructed to task 200) in a task model. Exemplary embodiments for exchanging information via input and output ports are further described below with reference to, for example, FIG. 4.

Figure 5:
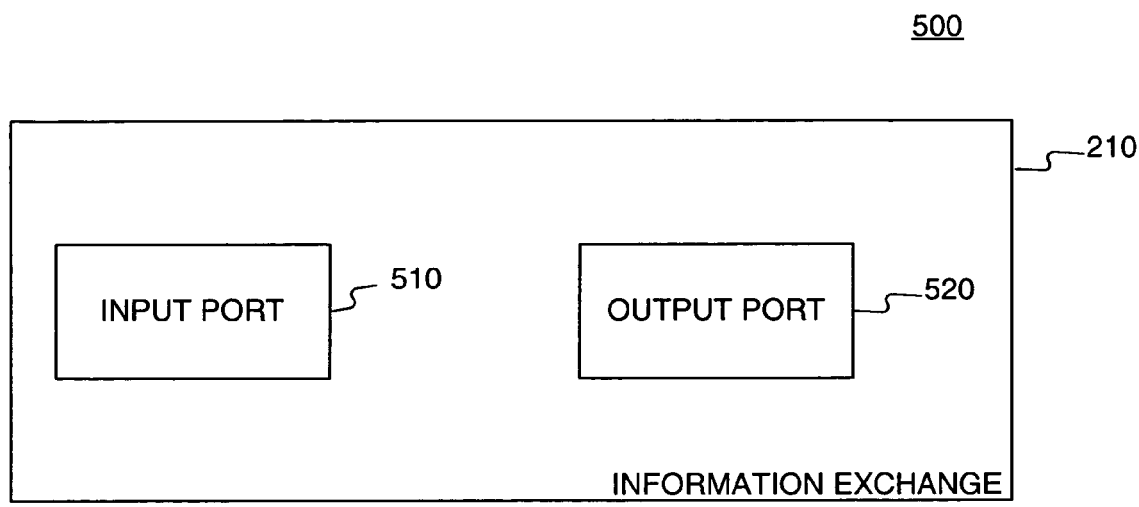
FIG. 5 illustrates an example of an information exchange component of a task, consistent with an embodiment of the invention.

Task state 220 may be implemented as a state flag, a record or similar software construct to capture the state that task 200 is currently in. Task state 220 may also handle or facilitate transitions between states, for example, as shown in FIG. 5.

Link to application specific logic 230 may attach task 200 to application specific code. This link may be implemented using references to objects implemented by task functionality 362, which may handle events fired by system 300. Link to application specific logic 230 may allow an application to be notified about changes to a task model. Link to application specific logic 230 may be modified by application logic 350 (cf. FIG. 3) dynamically. For example, a new version of an application may be implemented with new software module(s). Application logic 350 may use task functionality 362 to update link to application specific logic 230 to link with the new software modules. In this manner, greater flexibility may be provided for application and task model development.

Model specific task properties 240 may comprise properties for separating task model data from its respective semantics handled by model semantics 330, as described with reference to FIG. 3. Model specific task properties 240 may include, for example, the task's name and temporal operator, as well as indicate a precondition to executing a task, a postcondition to executing a task, a mean execution time, a frequency of use for the task, a priority of a task, and the role that a task performs. Moreover, model specific task properties 240 may indicate a task type, such as a user task, an interaction task, a system task, and an abstract task, as described in further detail below. Model specific task properties may also indicate whether a task is optional to achieve the goal of the task model, whether the task may be interrupted, whether the task is iterative, and whether the task manipulates other tasks or objects of task functionality 362.

Figure 3:
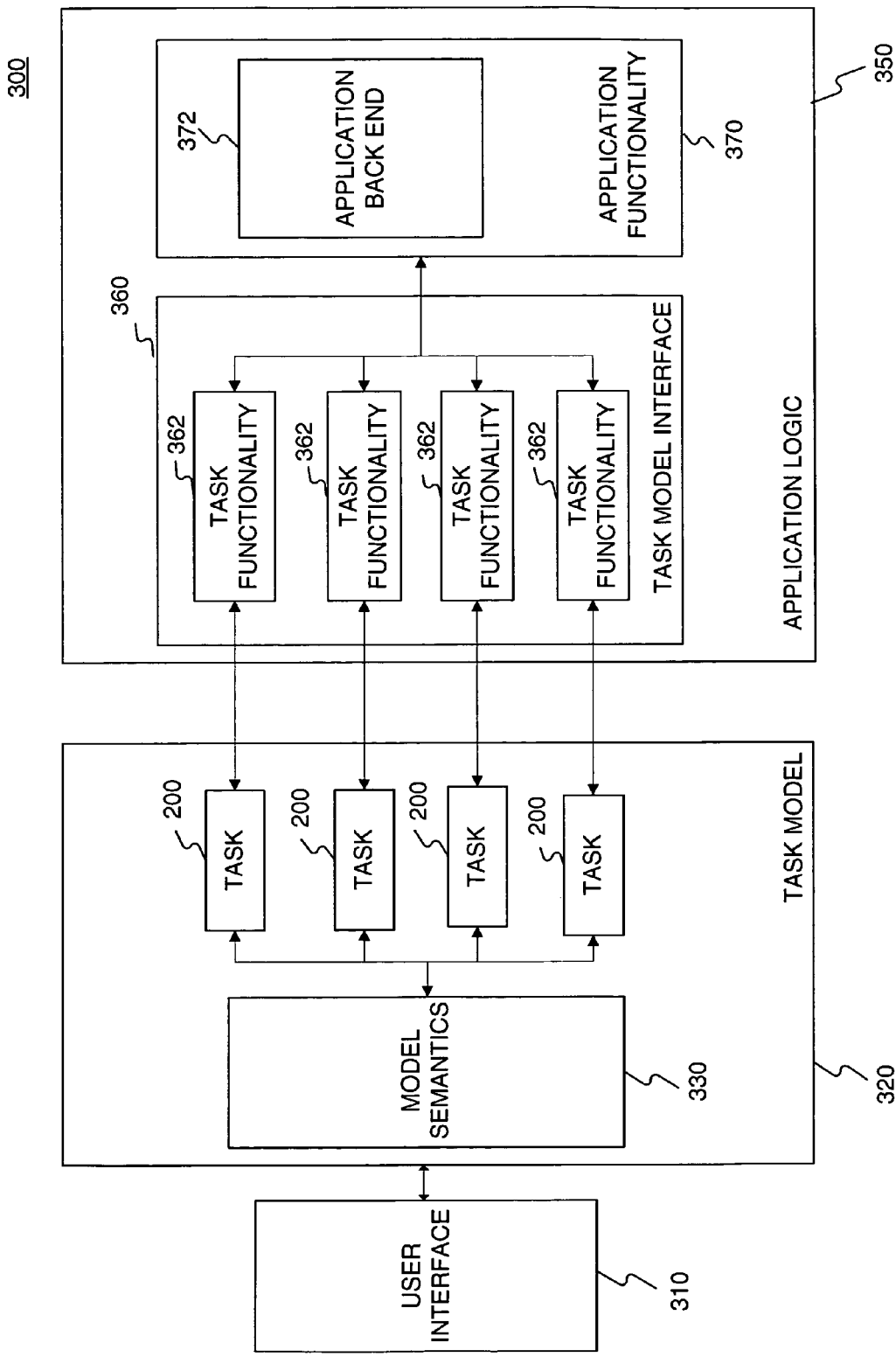
FIG. 3 illustrates a schematic block diagram of an exemplary system, consistent with an embodiment of the invention.

FIG. 3 illustrates a schematic block diagram of an exemplary system 300, consistent with an embodiment of the present invention. System 300 may include a user interface 310, task model 320, model semantics 330, a plurality of tasks (e.g. implemented consistent with task 200 of FIG. 2), application logic 350, task model interface 360, task functionality 362, application functionality 370, and application back end 372. As will be appreciated by those skilled in the art, system 300 may be modified to include additional or other components, while still providing features and functionality consistent with the principles of the present invention.

User interface 310 may allow users to interact with one or more workflow applications or other similar types of applications. In one embodiment, applications may be developed to support a variety of personal and commercial needs. For example, an application may be developed that allows doctors to treat patients. To further illustrate, an application may be developed that updates the task model according to steps that are needed to repair a machine. The application may update the task model depending on measurements to ensure that the machine may be efficiently repaired. Applications may also be developed for mobile environments, such as to allow a user to purchase a good from a vending machine using an interface on a cellular phone.

User interface 310 may comprise one or more graphical user interfaces (GUIs) or other suitable interfaces that are preferably computerized or software enabled. By way of example, user interface 310 may be a screen on a mobile device, such as a handheld device. User interface 310 may also comprise a computer monitor, television, or other display that render GUIs. In one embodiment consistent with the invention, user interface 310 may be an audible device, such as a voice activated automobile navigation system.

Pre-programmed user interface blocks or software components may generate user interface 310 from task model 320. In one embodiment, user interface 310 may be generated at runtime using application logic 350, which may interpret and use information generated by tasks 200 to update task model 320. User interface 310 may be constructed at runtime from the current state of task model 320.

For example, user interface 310 may be implemented as a stack of pre-defined GUI panels. In one embodiment consistent with the invention, each GUI panel may be represented by one panel. As long as task 200 is in an active state, the panel may be dynamically added to the GUI stack for display on user interface 310. Once the task 200 changes state to, for example, finished, the corresponding GUI panel may be removed from user interface 310 at runtime.

Tasks that require user input, referred to herein as "enabled interaction tasks," may be rendered on user interface 310. These tasks may be rendered using buttons, menus, drop down tables, or any other interface components allowing a user to interact with user interface 310. A user may then select, for example, a button if the user wishes to activate a particular task or set conditions or parameters for executing a task.

Tasks that do not require input from a user, such as "enabled application tasks," that are controlled by a workflow application or other application, may be displayed for a period defined by the application. Alternatively, tasks not requiring input from a user may not be displayed, or may be displayed only as selected by a user.

In another embodiment, user interface 310 may not rely on pre-defined GUI panels or require pre-programmed user interface blocks. Alternatively, user interface 310 may be dynamically assembled at runtime in any manner selected by a user or adaptively learned by system 300.

To further illustrate implementations of user interfaces consistent with the present invention, an exemplary user interface 900 is provided in FIG. 9. As shown in this example, user interface 900 may comprise one or more interface blocks. Each interface block may represent a task, such as a task that is part of a set of tasks that a doctor may use to diagnose and treat a patient. By way of example, user interface 900 includes a button 990 (entitled "finish lab order") which may be selected by a user to execute a task.

Consistent with a further aspect of the invention, task models 320 may separate temporal and semantic constraints induced by a user and his/her workflow from the application logic associated with a workflow application or other application. As used herein, a "workflow" refers to a set or series of tasks needed to be accomplished to achieve a goal. Task model 320 may track the current status of tasks (e.g., each implemented according to task 200 of FIG. 2) at runtime by using model semantics 330.

Model semantics 330 may organize tasks 200 by learning the interrelations between the tasks. Model semantics 330 may be implemented as a set of rules that update task model 320 according to temporal and semantic relationships between tasks. Tasks may exchange information as indicated by task model 320 through model semantics 330. Further, model semantics 330 may update the state of task model 320 when the state of individual tasks 200 changes, as described below with reference to the exemplary embodiment of FIG. 4. Model semantics 330 may be used by different applications. In one embodiment, model semantics 330 may match the model semantics used for building a model description. A model description may comprise a high-level task description of tasks 200, task model 320, and links to task functionality 362 for each task 200. The model description may also identify properties of tasks and how tasks are interrelated. This description may be loaded from a file when the workflow application or other application is started.

Tasks 200 may serve as a communication interface for model semantics 330 and task functionality 362. Tasks 200 may be categorized, for example, into application tasks, user tasks, and interaction tasks. An application task may execute functionality of an application and may only involve the system. For example, an application task may perform a mathematical calculation. A user task may be a task that a user completes. Users tasks may include only involve the user and may utilize context recognition to detect if the user has already completed the task. Once a user completes task 200, model semantics 330 or task functionality 362 may change the task state 220 accordingly. An interaction task may be a task requiring input from a user. Interaction tasks may involve both a user and system 300. For example, an interaction task may be implemented, for example, by rendering a graphical user interface 310 and waiting for the user to complete the interaction. By tracking the behaviors and interactions of a user with system 300, task model 320 may be dynamically updated at run time according to the preferences of the user. As illustrated in FIG. 3, each task 200 may correspond to task functionality 362 implementing the specific behavior of each task 200. The content of task functionality 362 may depend on the type of task 200 it is associated with. Tasks 200 may relate to multiple task functionalities 362, and more than one task functionality may relate to each task 200.

Application logic 350 represents the functional capabilities of a workflow application or other application. Examples of applications for providing application logic 350 include maintenance checklists, warehouse inventory management, or workflow applications, such as those commercially available from SAP AG (Walldorf, Germany). Application logic 350 may include task model interface 360, task functionalities 362, application functionality 370, and application back end 372.

Task model interface 360 may access and modify information represented by task 200, such as information exchange 210, task state 220, and task specific model properties 240. Task model interface 360 may also register additional components of task 200 using an event listener, and fire execution of events at the appropriate time. An event listener may be implemented as an object of task functionality 362. The event listener may determine when an event is fired by task 200. An event listener as an object of task functionality 362 may listen for and handle events from several tasks simultaneously. For example, if a first task 200 places information on output port 520, the event listener implemented by task functionality 362 corresponding to the first task 200 may detect the information on the output port, provide the information to an input port 510 of a second task 200, and update the states of the first task 200 and second task 200 appropriately.

Task functionality 362 may handle events fired by the corresponding task 200. Task functionality 362 may be an interface to application functionality 370. For example, an event may indicate a change of state such as enabled, activated, finished, suspended, resumed, disabled, new value on input port, and new value on output port. Task functionality 362 may change a task state 220 of its associated task 200 and read/write data from/to a task's information exchange 210.

Changes to task 200 may be observed by model semantics 330, which may update the state of task model 320 as necessary. For example, if task functionality 362 changes a task state 220 to "finished," model semantics 330 may activate another task 200 that is related to the finished task 200. This change in task state 220 may then be communicated to application logic 350.

Application functionality 370 may define the properties and capabilities of an application. Application functionality 370 and application back end 372 may provide services that are called by task functionalities 362 in order to execute task 200. Application back end 372 may serve an interface for the application with other system(s). For example, application back end 372 may provide an interface to one or more databases storing information needed by the application.

In one embodiment consistent with the present invention, system 300 may be a distributed system. For example, user interface 310 and task model 320 may be included within a client and application logic 350 may be included within a server. Communication between a client and server may be performed using well known communication methods, such as wireless or wired communication over a local area network, a wide area network, an intranet, the Internet, and the like. In another embodiment, system 300 may be contained within a single system.

Figure 4:
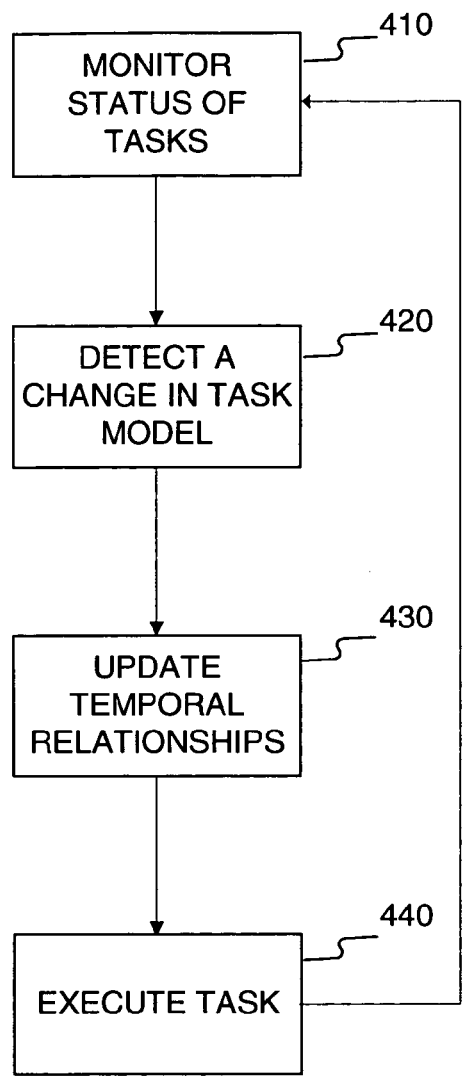
FIG. 4 illustrates a flowchart of an exemplary method for updating a task model at runtime, consistent with an embodiment of the invention.

FIG. 4 illustrates a flowchart of an exemplary method 400 for updating a task model at runtime, consistent with an embodiment of the invention. In accordance with one aspect, model semantics 330 and application logic 350 may update the temporal relationships, semantic relationships, and task state at runtime.

At step 410, an application may be executed and the status of tasks 200 may be monitored during execution. Model semantics 330 may implement an event listener to monitor the task states 220 and determine when task functionality 362 changes task 200 or task model 320. Task functionality 362 may also implement an event listener to monitor task states 220 and determine when model semantics 330 or application logic 350 changes task 200 or task model 320.

At step 420, model semantics 330 or task functionality 362 may detect a change in task model 330. A change may be, for example, the enabling of task 200, the activation of task 200, the finishing of task 200, the suspension of task 200, the resuming of task 200, the disabling of task 200, the detection of a new value on an input port 510 of task 200, and the detection of a new value on an output port 520 of task 200.

At step 430, the temporal relationships between tasks 200 may be updated in task model 330. For example, application logic 350 may complete a task, resulting in task functionality changing the state of a first task 200 to finished. Changes to tasks may also occur when a state change of a task fires changes to other tasks, such as when a parent task 200 transmits information to children tasks 200 using model semantics 330. Model semantics 330 may place parent task 200 in an inactive task state 220 while children tasks 200 obtain and return the information to parent task 200. Children tasks 200 may provide the information to parent task 200 task information exchange 210.

Task functionality may detect the change in task state 220 and notify model semantics 330 using task information exchange 210. Model semantics 330 may update task model 320 and user interface 310. For example, model semantics 330 may update task model 320 to reflect completion of the first task 200 and fire execution of a second task 200.

If model semantics 330 detects the change, task 200 may notify task functionality 362 using information exchange 210. Task functionality 362 may update application logic 350. In this manner, model semantics 330 may determine the organization of tasks 200 by maintaining the temporal relations between tasks 200 and by executing information exchange between tasks 200 as indicated by the task model 320.

At step 440, task 200 may be executed as determined by the updated temporal and semantic relationships. Model semantics 330 and task functionality 362 may then continue monitoring the status of tasks 200 at runtime.

FIG. 5 illustrates an example 500 of information exchange 210 for task 200, consistent with an embodiment of the present invention. Information exchange 210 may include input port 510 and output port 520, which serve as a communication interface for task 200. Input port 510 and output port 520 may define what information is provided to and consumed by specific tasks 200. In one embodiment consistent with the invention, each task 200 may have one or more input ports 510 and one or more output ports 520.

Information exchange may occur between directly related tasks, as well as disconnected tasks. The use of input port 510 and output port 520 allows information exchange between disconnected tasks. For example, task 112 may exchange information with task 124 (FIG. 1).

Input port 510 may indicate that task 200, or one of its child tasks 200, is able to consume a specific piece of information. Since information exchange may occur at another level, such as a higher level, in task model 320, ancestors of a task may inherit the input port 510 of the task. An ancestor may be the parent task of a parent task. For example, an input port on task 112 may be inherited by task 110 and any parents of task 110 (FIG. 1) because task 112 actually consumes the information.

At runtime, model semantics 330 may ensure that information received on an input port 510 of task 200 reaches descendents. Descendents may be the children of children tasks. For example, model semantics 330 may detect information arriving on input port 510 of task 110. Model semantics 330 may access task model 320 to determine where the information should be transmitted. Next, model semantics 330 may obtain the information from task 110 and provide the information to, for example, input port 510 of task 112, as well as to input port 510 of any children of task 112. As the number of tasks 200 in task model 320 increase, intermediate tasks may keep track of the input ports of descendents in task model 320.

Output port 520 may indicate that task 200 can provide information. Output ports 520 may be inherited by ancestors, such that if an output port 520 is defined on task 112, then task 110 and parent(s) of task 110 may inherit that output port 520.

At runtime, output port 520 may be, for example, a variable which carries the last value assigned to that output port 520. Information from an output port 520 on task 112 may be transmitted to all parent tasks to ensure that all ancestors are able to provide the information. In one embodiment consistent with the invention, if several children tasks have the same output port 520 and provide the same information, the parent task may store the last information provided by any of the children tasks.

An operator may be used to indicate the timing for transferring information from output ports 520 to related input ports 510. An operator may be a relation between tasks, such as part of the model specific task properties 240 for task 200. For example, an operator may indicate that when a first task 200 finished, the values of the first task's 200 output port 520 may be transferred to the respective input port 510 of a second task 200. Output ports 520 on the first task 200 without a matching input port 510 on the second task 200 may be ignored.

Another exemplary operator may indicate that whenever a new value is stored for an output port 520 on the first task 200, that value is immediately transferred to input port 510 on the second task 200. Similarly, if the output port 520 changes on the second task 200, the information may be transferred to input port 510 for the first task 200.

In one embodiment, model semantics 330 may ensure that every possible activation path through the children tasks include at least one child task with an appropriate output port 520. Monitoring and checking activation paths for completeness ensures that tasks 200 with input ports 510 receive the desired information through a corresponding output port 520 of a related task 200.

Figure 6:
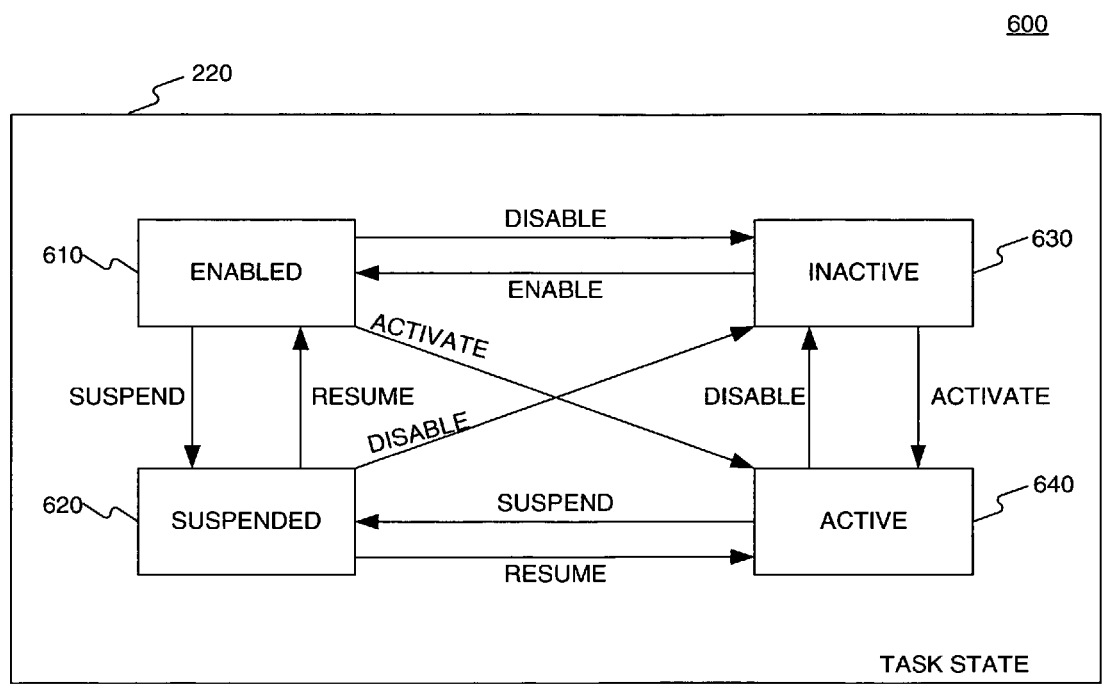
FIG. 6 illustrates an example of task state, consistent with an embodiment of the invention.

FIG. 6 illustrates an example 600 of task state 220, consistent with an embodiment of the present invention. Task states 220 and transitions between task states 220 may be used to capture the state of task model 320. In one embodiment, a ConcurTaskTree (CTT) model may be used to identify task states 220.

Task state 220 may indicate the status of task 200 in task model 320. Exemplary task states 220 may include enabled 610, suspended 620, inactive 630, and active 640. Active tasks 640 may be tasks that are currently being executed. An enabled task 610 may not be active, but may become active at any time. For example, a user may be presented an option on user interface 310 to begin filling out a form. Task 200 for filling out the form may be in an enabled state 610. Once the user begins filling out the form, the corresponding task 200 may be activated 640.

Suspended tasks 620 may be tasks that were enabled 610 or active 640, but got interrupted by a task 200 having a higher priority. Once the task 200 having a higher priority finishes, the interruption will end and the suspended task 620 may resume an enabled 610 state or active 640 state. Inactive tasks 630 may be tasks that are part of task model 320 but are not currently capable of being executed. For example, a task 200 associated with filling a prescription may be inactive 630 until tasks 200 associated with diagnosing a patient to determine what prescription a patient needs have been executed.

Using a dynamic runtime task model, more than one task may be in an active state at the same time. This allows a user to interrupt a first task to accomplish another task. As a result, multiple child tasks 112, 114, 122, and 124 may be active 640 at the same time.

Figure 7:
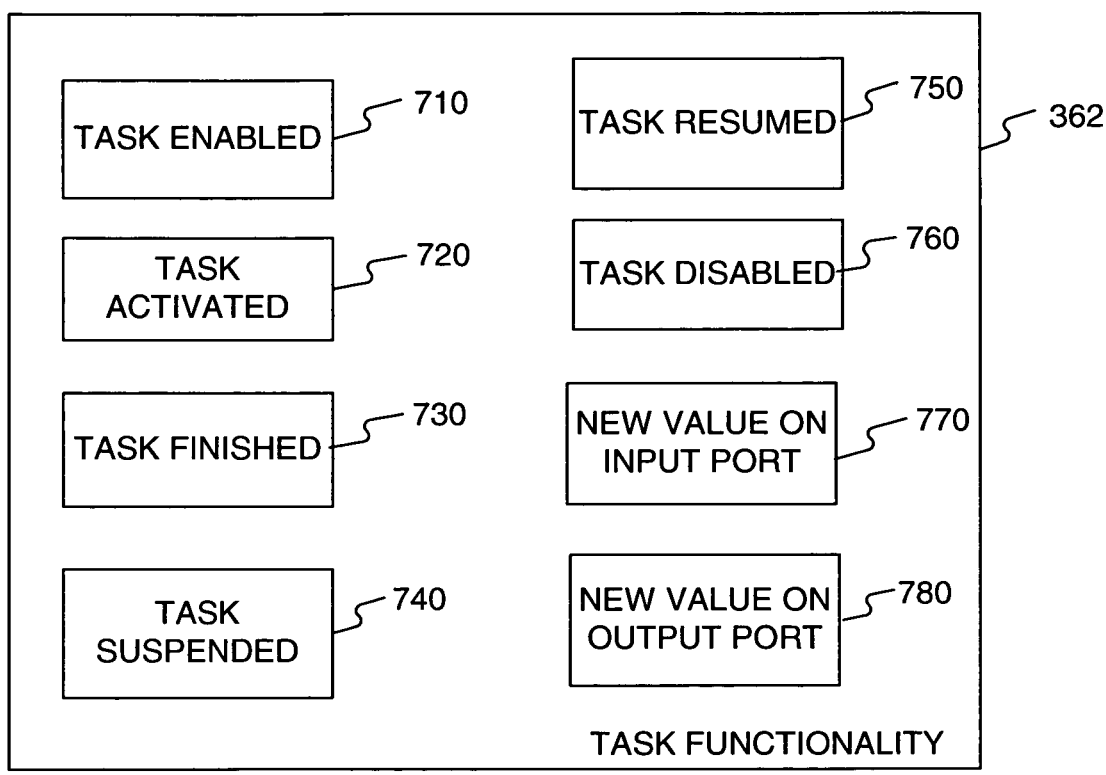
FIG. 7 illustrates an example of task functionality, consistent with an embodiment of the invention.

FIG. 7 illustrates an example 700 of task functionality 362, consistent with an embodiment of the present invention. As discussed above, task functionality 362 may handle events fired by the corresponding task 200. For example, task functionality 362 may include event handlers that indicate task enabled 710, task activated 720, task finished 730, task suspended 740, task resumed 750, task disabled 760, new value on input port 770, and new value on output port 780. These event handlers may be used by task functionality 362 to indicate a current state of task 200 to application logic 350, as well as to control access by tasks 200 to and from application logic 350.

Figure 8:
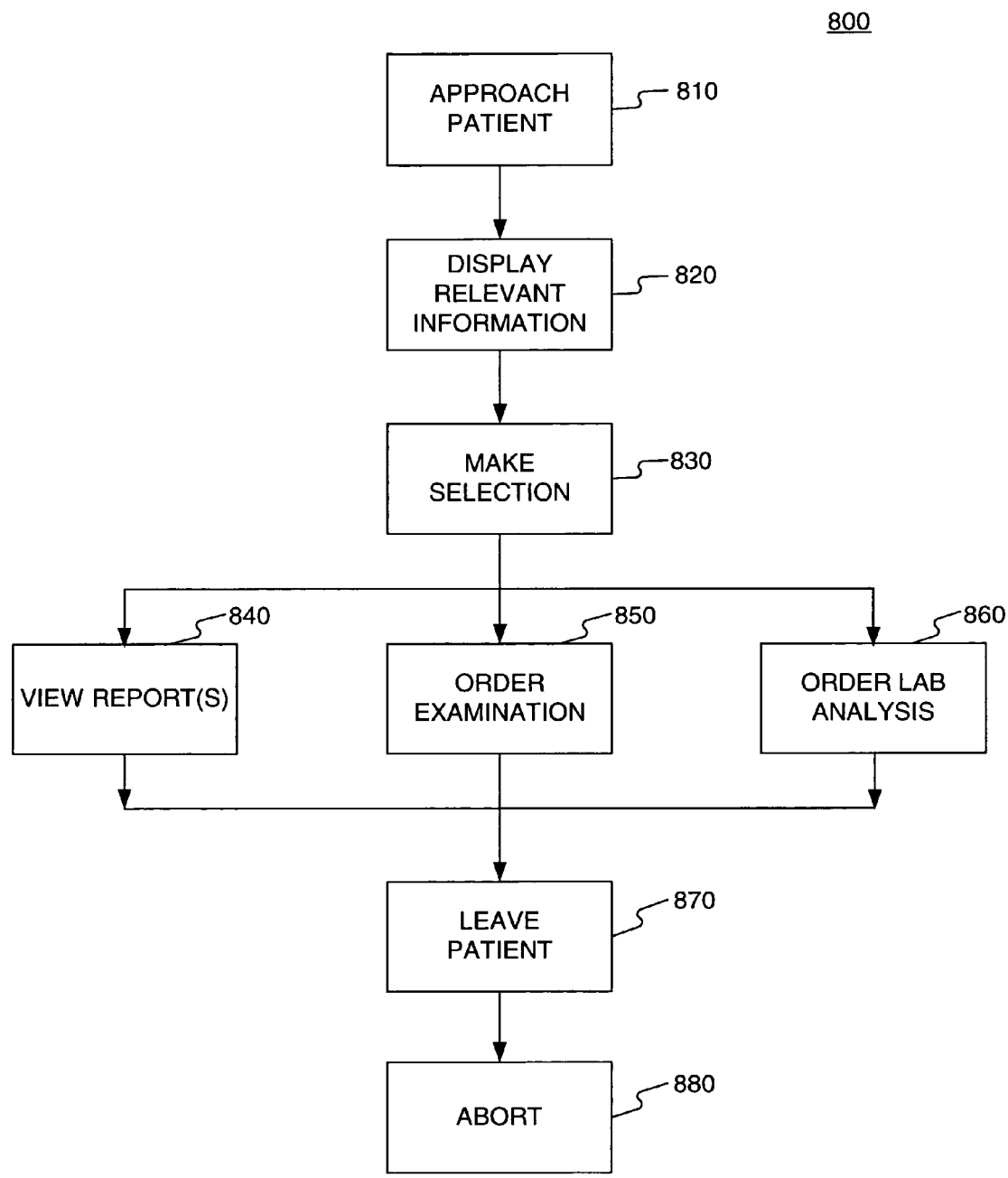
FIG. 8 illustrates a flowchart of exemplary application that uses an executable task model at runtime, consistent with an embodiment of the invention.

FIG. 8 illustrates a flowchart of an exemplary method 800 that uses an executable task model at runtime, consistent with an embodiment of the present invention. For purposes of illustration, the exemplary method 800 will be described with reference to the example of a doctor interacting with a patient. As will be appreciated by one skilled in the art, the principles of FIG. 8 may be adapted for other task models and scenarios, consistent with the principles of the invention.

At step 810, a doctor or nurse may approach a patient. By approaching the patient, the task model 320 may automatically call a task 200 to retrieve relevant information about the patient.

For example, patients may wear a wireless identification device that is associated with doctors and nurses. When a doctor approaches the patient, the wireless identification device may execute a task 200 using task functionality 362 that notifies a mobile, handheld device used by the doctor. The handheld device may be notified by transmitting the patient identifier to input port(s) 410 of each task 200 belonging to a task model 320 for "processing patient." The doctor's handheld device may also search for patient identification device broadcasts using a detection task 200. Detection task 200 may become activated by task functionality 362 to detect a patient identifier. Once task functionality 362 identifies a patient, model semantics 330 may place the detection task 200 in an inactive state.

The doctor's handheld device may then execute a task 200 to retrieve information regarding the patient. For example, a retrieval task 200 may be placed in active state and utilize associated task functionality to access information from application logic 350. Application logic 350 may access application back end 372 to retrieve patient information from a database. The information may then be placed on input port 510 of retrieval task 200 by task functionality 362.

Alternatively, the doctor may configure his/her handheld device to only retrieve relevant patient information on demand. These exemplary modifications may be updated at run-time, and tasks 200 may be appropriately redefined as described above.

At step 820, the relevant patient information may be displayed on the doctor's handheld device. This may be accomplished by transmitting the patient information from retrieval task 200 to a display task 200. Display task 200 may be placed in an active state and utilize a pre-defined GUI panel to update user interface 310 with the retrieved patient information. Retrieval task 200 may, for example, be placed in an inactive state, but riot disabled, such that additional information may be retrieved for display as needed.

The doctor's handheld device may include user interface 310 and may be customizable by the doctor. For example, the doctor may define what information is "relevant," such as blood pressure, history of diabetes, etc. The retrieval task 200 may also determine what patient information is "relevant" using one or more child tasks 200. Because user interface 310 and task models 320 may be executed at runtime, the doctor may easily customize information retrieval and display to accommodate varying patient settings.

Relationships between tasks 200 may be modified at runtime by adding or removing operators that associate tasks 200. For example, in emergency situations, the doctor may not have time to analyze all relevant patient information. In these situations, task model 320 may be modified at runtime to only execute certain tasks. For example, if retrieval task 200 utilized children tasks 200 to obtain each piece of patient information, only those children tasks 200 that retrieve vital life signs may be activated.

At step 830, a doctor may make a selection through user interface 310. Although only three options are discussed herein, the number of selections available to a doctor in this exemplary system are numerous and, thus, any number of features may be available to a doctor. Moreover, the doctor may add new features to task model 320 and establish new relationships between tasks 200 for execution at runtime. In one embodiment, a doctor may establish new tasks 200 and relationships between tasks in a task model by executing a software application to customize the doctor's system. Additionally, system 300 may adaptively learn the characteristics and desires of a doctor. For example, if a doctor often skips a task 200 requiring the doctor's input, this task 200 may be removed from the task model 320 to tailor the application to the doctor's preferences.

At step 840, the doctor may view reports regarding past medical history, current diagnosis, or results of tests and procedures. Retrieval of the reports may be executed by one or more tasks 200 similar to the process described above for retrieving patient information. Retrieval of past medical history by a history task 200 may result in history task 200 calling a retrieval task 200 that obtains current patient information. This may occur, for example, when no patient history is available. History task 200 may utilize output port 410 to request information from input port 410 of retrieval task 200.

At step 850, the doctor may order an examination. This may require execution of tasks 200 by additional users. In this manner, a doctor's selection to order examination may cause a task 200 to execute a process for asking or prompting a nurse to order the examination. The nurse may in turn order the examination performed by another nurse, or have the examination scheduled by a third party. This example illustrates that new associations between tasks 200 may be established dynamically at runtime, providing greater flexibility in the application.

At step 860, the doctor may order lab analysis 760. As with ordering an examination (step 750), this task 200 may be dynamically executed by one or more children tasks 200, or by tasks 200 associated with other individuals.

The doctor may also retrieve further relevant information, such as information regarding the results of prior examinations or additional medical history. Once the doctor has completed treatment of the patient, at step 870, at doctor may leave the patient. At step 880, the system may abort or terminate, such as when the patient's wireless identification device is out of the range of the doctor's handheld device. This may result in all tasks 200 being placed in a disabled or inactive state.

Dynamic task models consistent with the invention may be useful in a variety of settings, such as mobile environments. As disclosed herein, a dynamic task model may allow applications to maintain a workflow by accessing the runtime task model and may allow the task model to be modified by the application on demand.

Other embodiments of the invention will be apparent to those skilled in the art from consideration of the specification and practice of embodiments and features of the invention disclosed herein. It is intended, therefore, that the specification and embodiments be considered as exemplary only, with a true scope and spirit of the invention being indicated by the following claims.

What is claimed is:

1. A computer-implemented method for executing a task model at runtime, the method comprising:
    providing a task model comprising a plurality of tasks, wherein the task model defines: semantic relationships between the tasks, the semantic relationships including parent and child relationships between the tasks and indications that one of the tasks is an alternative for another one of the tasks, and
    an input port and an export port for exchanging between tasks that have different parent tasks;
    executing an application, using a processor, to schedule one or more of the tasks;
    monitoring the state of one or more of the tasks;
    detecting a change in the state of one or more of the tasks;
    generating, during runtime execution of the application, a graphical user interface that presents one or more tasks for selection;
    monitoring a selection of one or more tasks through the graphical user interface by a plurality of users, the selection changing the state of one or more of the tasks;
    learning characteristics of a user from a user's task selection history; updating, during runtime execution of the application, the task model based on the changes in the state of one or more of the tasks;
    updating the task model based on the learned characteristics; and
    modifying, during runtime execution of the application, the graphical user interface based on the updated task model.

2. The computer-implemented method of claim 1, wherein each task comprises:
    a task state;
    a link to application specific logic for the application, the application comprising a workflow application; and
    properties specific to the task model.

3. The computer-implemented method of claim 1, wherein executing the application comprises:

executing more than one task concurrently,
associating a priority with one or more of the tasks;
substituting, during runtime execution of the application, an alternative task for one or more of the tasks based on the priority; and
updating the task model based on the substituted alternative task.

4. The computer-implemented method of claim 1, wherein monitoring the state of the tasks comprises:
registering the tasks with an event listener; and
determining a state of the tasks with the event listener.

5. The computer-implemented method of claim 1, wherein monitoring the state of the one or more of tasks comprises:
registering an input port for a task with an event listener, and
registering an output port for the task with the event listener.

6. The computer-implemented method claim 5, wherein detecting a change in the state of the one or more tasks comprises:
detecting, with the event listener, one or more new values on the input port of the task; and
detecting, with the event listener, one or more new values on the output port of the task.

7. The computer-implemented method of claim 1, wherein updating the task model comprises changing the schedule of the tasks by altering an order of execution of the tasks.

8. The computer-implemented method of claim 1, wherein updating the task model at runtime comprises at least one of removing one or more tasks from the task model or adding one or more tasks to the task model.

9. The computer-implemented method of claim 1, further comprising:
displaying graphical representations of the tasks on a user interface;
executing the tasks based on selections of the graphical representations made by a user;
changing the state of the executing tasks to indicate that the tasks are active;
determining when the execution of the tasks are complete;
changing, when the execution of the tasks are complete, the state of the executed tasks to indicate that the tasks are inactive; and
removing the graphical representations of the inactive tasks from the user interface.

10. A computer-readable medium that stores a set of instructions which, when executed, performs a method for executing a task model at runtime, the method comprising:
executing an application to schedule one or more of tasks of the task model, wherein the task model defines;
semantic relationships between the tasks, the semantic relationships including parent and child relationships between the tasks and indications that one of the tasks is an alternative for another one of the tasks, and
an input port and an export port for exchanging between tasks that have different parent tasks;
monitoring the state of one or more of the tasks;
detecting a change in the state of one or more of the tasks;
generating, during runtime execution of the application, a graphical user interface that presents one or more tasks for selection;
monitoring a selection of one or more tasks through the graphical user interface by a plurality of users, the selection changing the state of one or more of the tasks;
learning characteristics of a user from a user's task selection history;
updating, during runtime execution of the application, the task model based on the changes in the state of one or more of the tasks;
updating the task model based on the learned characteristics; and
modifying, during runtime execution of the application, the graphical user interface based on the updated task model.

11. The computer-readable medium of claim 10, wherein each task comprises:
a task state;
a link to application specific logic, the application comprising a workflow application; and
properties specific to the task model.

12. The computer-readable medium of claim 10, wherein executing the application comprises:
executing more than one task concurrently;
associating a priority with one or more of the tasks;
substituting, during runtime execution of the application, an alternative task for one or more of the tasks based on the priority; and
updating the task model based on the substituted alternative task.

13. The computer-readable medium of claim 10, wherein monitoring the state of the tasks comprises:
registering the tasks with an event listener;
determining the state of the tasks by the event listener; and
detecting execution of the tasks by the event listener.

14. Computer-readable medium of claim 10, wherein:
monitoring the state of the one or more of tasks comprises:
registering an input port for a task with an event listener; and
registering an output port for the task with the event listener.

15. The computer-readable medium of claim 14, wherein detecting a change in the state of the one or more tasks comprises:
detecting, with the event listener, one or more new values on the input port of the task; and
detecting, with the event listener, one or more new values on the output port of the task.

16. The computer-readable medium of claim 10, wherein updating the task model comprises changing the schedule of the tasks by altering an order of execution of the tasks.

17. The computer-readable medium of claim 10, wherein updating the task model at runtime comprises at least one of removing one or more tasks from the task model or adding one or more tasks to the task model.

18. The computer-readable medium of claim 10, further comprising:
displaying graphical representations of the tasks on a user interface;
executing the tasks based on selections of the graphical representations made by a user;
changing the state of the executing tasks to indicate that the tasks are active;
determining when the execution of the tasks are complete;
changing, when the execution of the tasks are complete, the state of the executed tasks to indicate that the tasks are inactive; and
removing the graphical representations of the inactive tasks from the user interface.

19. A system for executing a task model at runtime, the system comprising:
means for executing an application to schedule one or more tasks of the task model, wherein the task model defines;

semantic relationships between the tasks, the semantic relationships including parent and child relationships between the tasks and indications that one of the tasks is an alternative for another one of the tasks, and an input port and an export port for exchanging between tasks that have different parent tasks;

means for monitoring a state of one or more of the tasks and for detecting a change in the state of one or more of the tasks; and means for generating, during runtime execution of the application, a graphical user interface that presents one or more tasks for selection;

means for monitoring a selection of one or more tasks through the graphical user interface by a plurality of users, the selection changing the state of one or more of the tasks;

means for learning characteristics of a user from a user's task selection history;

means for updating, during runtime execution of the application, the task model based on the changes in the state of one or more of the tasks;

means for updating the task model based on the learned characteristics; and means for modifying, during runtime execution of the application, the graphical user interface based on the updated task model.

20. The system of claim 19, wherein each task comprises:

a task state;

a link to application specific logic for the application, the application comprising a workflow application; and properties specific to the task model.

* * * * *